United States Patent Office 3,476,761
Patented Nov. 4, 1969

3,476,761
10- AND 11-(4-PIPERIDYL)DIBENZO [a,d]CYCLOHEPTATRIENES
Jean Clement Louis Fouché, Bourg-la-Reine, France, assignor to Rhone-Poulenc S.A., Paris, France, a French body corporate
No Drawing. Filed May 19, 1966, Ser. No. 551,207
Claims priority, application France, May 25, 1965, 18,349; Mar. 2, 1966, 51,697; Apr. 14, 1966, 57,649
Int. Cl. C07d 29/36, 29/10, 29/12
U.S. Cl. 260—293.4        9 Claims

ABSTRACT OF THE DISCLOSURE

The invention provides novel unsubstituted or nuclearly substituted 10- and 11-(4-piperidyl)dibenzo[a,d]cycloheptatrienes and their salts which are active as neuroleptics, sedatives, tranquillisers, antidepressants, antihistamics, antiserotonines, analgesics, spasmolytics and antiemetics.

---

This invention relates to new therapeutically useful dibenzocycloheptatriene derivatives to processes for their preparation and to pharmaceutical compositions containing them.

According to the present invention, there are provided the new dibenzo[a,d]cycloheptatriene derivatives of general formula:

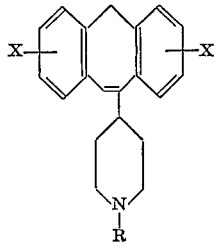

wherein one of the two X substitutents is a hydrogen atom and the other is a hydrogen or halogen atom, or an alkyl, alkoxy, alkylthio, alkanesulphenyl or alkanesulphonyl group of up to 5 carbon atoms, and R represents a hydrogen atom, or an alkyl, alkenyl, alkynyl, hydroxyalkyl, hydroxyalkoxyalkyl radical of up to 5 carbon atoms or a phenylalkyl or phenylalkenyl radical of up to 11 carbon atoms in which the phenyl nucleus may be substituted together with the acid addition salts and the quaternary ammonium salts of these compounds.

The compounds of general Formula I may, if desired, be purified by physical methods (such as distillation, crystallisation or chromatography) or by chemical methods (such as the formation of salts, crystallisation of these and subsequent decomposition in an alkaline medium). In these processes the nature of the anion in the salt does not matter, the sole condition being that the salt should be well defined and easily crystallisable.

The compounds of this invention may be converted to addition salts with acids and to quaternary ammonium salts. The acid addition salts may be obtained by reacting the compounds with acids in appropriate solvents. Suitable organic solvents include alcohols, ethers, ketones and chlorinated solvents. The salt formed precipitates, after concentration of the solution where appropriate, and is separated off by filtration or decantation. The quaternary ammonium salts may be obtained by reaction of the compounds with esters, optionally in an organic solvent, at ordinary temperatures or, more rapidly, with gentle heating.

The compounds of the invention, together with their addition salts and their quaternary ammonium salts, have interesting pharmacodynamic properties. They are especially effective on the central nervous system, acting as neuroleptics, sedatives, tranquillisers and anti-depressants. They also have good antihistamine, antiserotonine, analgesic, spasmolytic and antiemetic effectiveness.

For medicinal purposes the new compounds may be used either in the form of the base or in the form of pharmaceutically acceptable addition salts or quaternary ammonium salts, that is to say salts which are non-toxic at the dosages at which they are used. Examples of pharmaceutically acceptable addition salts include salts of certain mineral acids, such as the hydrochlorides, sulphates, nitrates and phosphates, and of certain organic acids, such as the acetates, propionates, succinates, benzoates, fumarates, maleates, theophyllineacetates, salicylates, phenolphthalinates and methylene-bis-$\beta$-oxynaphthoates, and derivatives of these acids. Examples of pharmaceutically acceptable quarternary ammonium salts include derivatives of mineral or organic esters, such as methyl, ethyl, allyl and benzyl chlorides, bromides and iodides, methylsulphates and ethylsulphates, benzenesulphonates, and substituted derivatives of these compounds.

Amongst the compounds of Formula I those of especial importance are those of general formula:

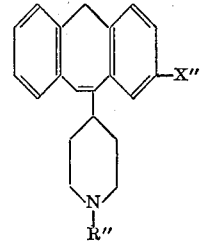

wherein X" represents a hydrogen or chlorine atom or a methylthio group, and R" represents an alkyl radical of up to 5 carbon atoms or a phenylalkyl radical of up to 11 carbon atoms in which the phenyl nucleus may be substituted by one or more halogen, alkyl or alkoxy of up to 5 carbon atoms, amine or trifluoromethyl radicals; together with the acid addition salts and quaternary ammonium salts of these compounds.

1. According to a feature of the invention, the new compounds of general Formula I may be prepared by dehydrating a compound of the formula:

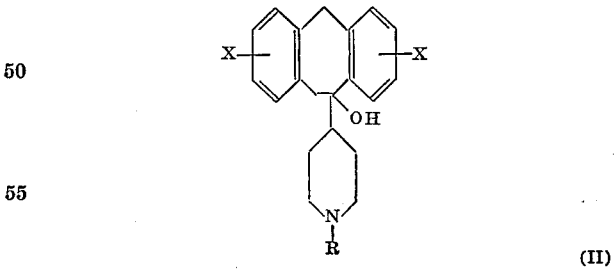

wherein X and R are as hereinbefore defined, and optionally converting the resultant base to an acid addition salt or a quaternary ammonium salt.

This dehydration is generally carried out by the usual mehod of dehydrating tertiary alcohols. Advantageously the process consists of heating the compound of Formula II in an aqueous or aqueous/organic medium, usually in the presence of a strong acid such as methanesulphonic acid, and conveniently at a temperautre between 50° C. and the reflux temperature of the reaction medium.

The starting material of Formula II may be prepared by the following routes:

(a) The dibenzo[a,d]cycloheptadiene derivatives of general Formula II in which R is not a hydrogen atom may be obtained by reducing dibenzo[a,d]cycloheptadiene derivatives of general formula:

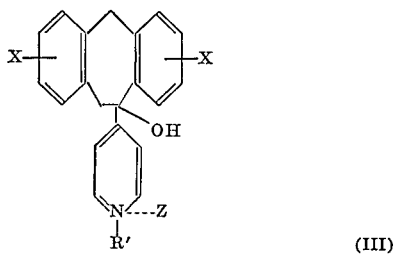

in which X is as defined above, R' represents an alkyl, alkenyl, alkynyl, hydroxyalkyl, hydroxyalkoxyalkyl, phenylalkyl or phenylalkenyl radical, in which the phenyl ring may be substituted as indicated above for R, and Z represents an anion. This reduction may be carried out by the classical methods of reduction of pyridinium salts, and preferably is effected by catalytic hydrogenation, in an aqueous alcoholic medium, at ordinary pressures and temperatures, in the presence of platinum as the catalyst.

The dibenzo[a,d]cycloheptadiene derivatives of general Formula III may be obtained by quaternisation of a dibenzo[a,d]cycloheptadiene derivative of general formula:

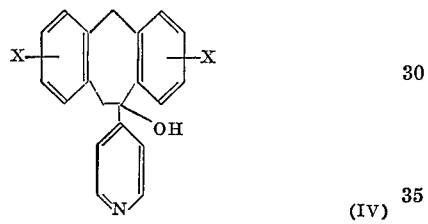

in which X is as defined above, by reaction with a reactive ester of general formula:

$$Z—R' \qquad (V)$$

in which R' and Z are defined as above. This quaternisation is normally carried out in an organic solvent, at ordinary temperature or, more rapidly, with gentle heating.

The dibenzo[a,d]cycloheptadiene derivatives of general Formula IV may be obtained by reaction, preferably in ether at about —70° C., of pyridyl lithium with a dibenzo[a,d]cycloheptadiene derivative of general formula:

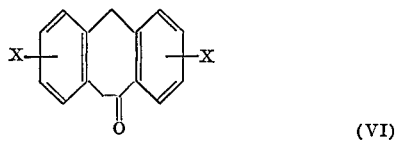

in which X is as defined above.

The ketones of general Formula VI may be prepared as follows:

(i) Those in which one of the symbols X represents a hydrogen atom and the other represents a hydrogen or halogen atom or an alkyl, alkoxy or alkylthio radical may be obtained by cyclisation of substituted phenylacetic acids of general formula:

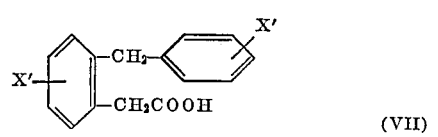

in which one of the symbols X' represents a hydrogen atom and the other represents a hydrogen or halogen atom or an alkyl, alkoxy or alkylthio radical. This cyclisation is advantageously carried out by heating the compounds of general Formula VII in the presence of polyphosphoric acid or of its esters, preferably at a temperature of between 60 and 180° C. However, it is also possible to convert the compounds of general Formula VII to the corresponding acid chlorides by the usual methods, and then to cyclise the latter by means of a Friedel-Crafts reaction, for example by treatment with aluminium chloride in a solvent such as carbon disulphide.

The substituted phenylacetic acids of general Formula VII may be prepared from orthobenzylbenzoic acids of general formula:

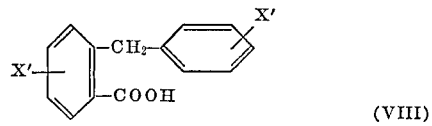

in which X' has the meaning given above, by known methods for converting an acid to its higher homologue. Thus the acids of general Formula VIII may first be esterified by reaction with methyl alcohol, and the esters obtained reduced so as to yield alcohols of general formula:

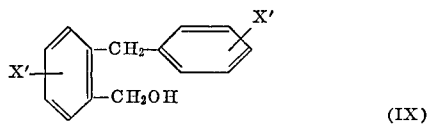

in which the symbols X' are defined as above. On treatment with a suitable halogenating agent, preferably a chlorinating agent such as thionyl chloride, these alcohols yield halogenated derivatives of general formula:

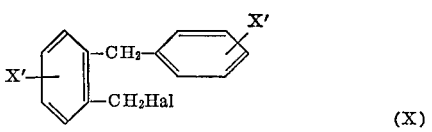

in which Hal represents a halogen atom, preferably chlorine or bromine. On treatment with an alkali cyanide, these halogenated derivatives of Formula X yield nitriles of general formula:

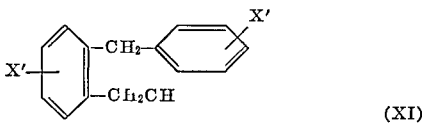

whose hydrolysis yields acids of general Formula VII.

The orthobenzylbenzoic acids of general Formula VIII may be prepared by known methods. A preferred method consists of reacting, under Friedel-Crafts reaction conditions, phthalic anhydride, or a substituted phthalic anhydride, with a compound of general formula:

in which X' is defined as above, so as to yield an ortho-aroylbenzoic acid of general formula:

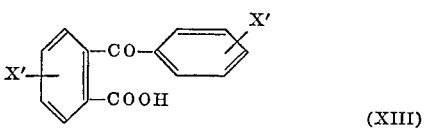

which is then reduced to yield the desired orthobenzylbenzoic acid (VIII). This latter stage may be carried out by conventional methods, for example by hydrogenation in the presence of a hydrogenation catalyst such as palladium, or by reaction with a reducing agent such as zinc in an ammoniacal medium.

The orthobenzylbenzoic acids of Formula VIII may also be prepared by reducing phthalides of general formula:

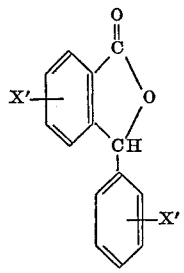

(XIV)

in which the symbols X' are defined as above. This reduction may conveniently be carried out by means of zinc in an ammoniacal medium, whilst the phthalides of Formula XIV may be themselves prepared in accordance with the following reaction scheme:

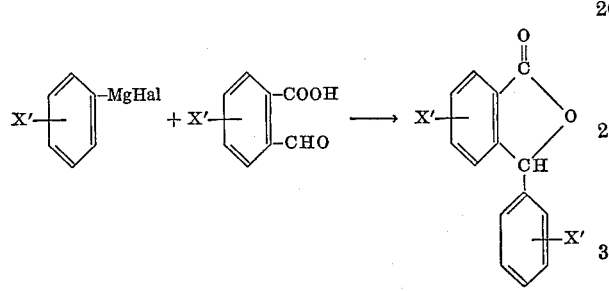

in which the symbols X' are defined as previously.

(ii) Those ketones of general Formula VI in which one of the symbols X represents a hydrogen atom and the other represents an alkanesulphinyl or alkanesulphonyl radical, may be prepared by oxidising the corresponding ketone of Formula VI in which one of the symbols X represents an alkylthio radical. This oxidation may be carried out by reaction with hydrogen peroxide in an acetic acid medium.

(b) The dibenzo[a,d]cycloheptadient derivatives of general Formula II in which R represents a hydrogen atom may be obtained by, for example, debenzylation of dibenzo[a,d]cycloheptadiene derivatives of general formula:

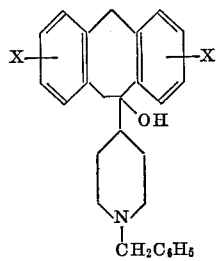

(XV)

in which the symbols X are defined as previously. This process is normally carried out under the usual debenzylation conditions, namely catalytic hydrogenation in the presence of palladium on charcoal, in an alcoholic solvent, at 50 to 100 bars pressure and at a temperature of between 50 and 100°.

2. According to a further feature of the invention, the products of Formula I in which R represents a hydrogen atom may also be prepared from the corresponding derivatives in which the nitrogen atom of the piperidine ring carries a substituent which is easily replaced by a hydrogen atom by treating so as to replace the said radical by a hydrogen atom. Thus they may, for example, be prepared by debenzylation of compounds of general Formula I in which R is a benzyl radical, the debenzylation being conveniently effected as indicated above under (b) for the debenzylation of compounds of Formula XV.

3. In another embodiment of the invention, where R is other than a hydrogen atom it is possible to prepare the desired product of Formula I by reacting a dibenzo[a,d]cycloheptatriene derivative of general formula:

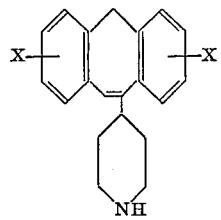

(XVI)

in which the symbols X are defined as above, with a reactive ester of general formula $$Y—R'$$ (XVII)

wherein R' is as defined above and Y represents a reactive ester residue, such as a halogen atom or a sulphuric or sulphonic ester residue, for example a methoxysulphonyloxy, methanesulphonyloxy or p-toluenesulphonyloxy residue. It is generally preferable to carry out this process in an inert organic solvent, such as ethanol or dimethylformamide, preferably at the boiling point of the solvent, and to use as the condensation reagent an alkali metal derivative, such as sodium bicarbonate or sodium carbonate, or a tertiary organic base.

4. In yet a further embodiment of the invention, compounds of Formula I in which one of the symbols X represents a hydrogen atom and the other represents an alkanesulphinyl or alkanesulphonyl radical may be prepared by oxidising the corresponding compounds of Formula I in which one of the symbols X is a hydrogen atom and the other an alkylthio radical. This oxidation may be carried out by reaction with hydrogen peroxide in an acetic acid medium.

The invention is illustrated in the following examples, in which the nomenclature is based on the following numbering system:

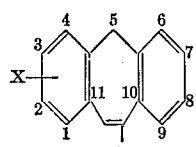

where X represents a hydrogen atom or an organic substituent, and

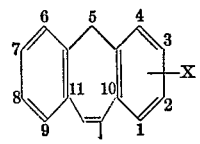

where X represents an organic substitutent. In these examples all temperatures are given in degrees Centigrade.

Example 1

A solution of 10-hydroxy-10(1-methyl-4-piperidyl)-dibenzo[a,d]cycloheptadiene (12.3 g.) in a mixture consisting of an aqueous solution of 2 N methanesulphonic acid (40 cc.) and distilled water (120 cc.) is heated under reflux for 75 minutes. After cooling, the solution is rendered alkaline by 10 N caustic soda (30 cc.) and the oil which separates out is extracted 3 times with ether (total 420 cc.), followed by methylene chloride (100 cc.).

The combined organic solutions are dried over anhydrous sodium sulphate and evaporated. The crystalline residue obtained (11.2 g.) is dissolved in boiling acetonitrile (80 cc.). After 16 hours cooling at 3°, the crystals which have appeared are filtered off, washed twice with ice cold acetonitrile (total of 20 cc.) and dried under reduced pressure (2 cm. Hg). 10-(1-methyl-4-piperidyl)dibenzo [a,d]cycloheptatriene (9.7 g.), melting at 119–120° C., is obtained.

The 10 - hydroxy - 10 - (1-methyl-4-piperidyl)dibenzo [a,d]cycloheptadiene (M.P. 198° C.) utilised as the starting material may be prepared as follows:

(a) Preparation of 10-oxo-dibenzo[a,d]cycloheptadiene according to N. J. Leonard and Collaborators, J. Am. Chem. Soc. 77, 5081 (1955).

(b) Preparation of 10-hydroxy - 10 - (4-pyridyl)dibenzo[a,d]cycloheptadiene (M.P.=218°, 34.5 g.), by reaction of 4-pyridyl lithium (prepared from 4-bromopyridine, 126 g.) with 10-oxo-dibenzo[a,d]cycloheptadiene (83.2 g.), in ether at −70°.

(c) Preparation of 4-(10-hydroxy - 10 - dibenzo[a,d]-cycloheptadienyl)-1-methyl pyrodinium bromide (M.P.= 236–238°, 41.8 g.) by reaction of methyl bromide (145 g.) with 10-hydroxy-10-(4 - pyridyl)dibenzo[a,d]cycloheptadiene (34.2 g.) working in acetonitrile at 80°.

(d) Preparation of 10-hydroxy - 10 - (1-methyl-4-piperidyl)dibenzo[a,d]cycloheptadiene (M.P.=198°, 24.6 g.) by hydrogenation of 4-(10-hydroxy-10-dibenzo[a,d]cycloheptadienyl)-1-methyl pyridinium bromide (41.0 g.) at ordinary temperature and pressure in aqueous ethanol solution, in the presence of an ADAMS platinum catalyst.

Example 2

A solution of 10-hydroxy-10-(1-benzyl-4-piperidyl)-dibenzo[a,d]cycloheptadiene (9.2 g.) in pure acetic acid (50 cc.), has distilled water (100 cc.) added to it followed by a 2 N aqueous solution of methanesulphonic acid (50 cc.). The homogeneous reaction mixture is heated under reflux for 4 hours. After cooling, the solution obtained is diluted with distilled water (150 cc.), and rendered alkaline with 10 N caustic soda (80 cc.). The oil which separates out is extracted 3 times with ether (total 600 cc.). The combined organic solutions are dried over anhydrous potassium carbonate and evaporated. The residue obtained (8.8 g.) is dissolved in boiling acetonitrile (37 cc.). After 6 hours cooling at 3°, the crystals which have appeared are filtered off, washed twice with ice cold acetonitrile (total 15 cc.), and dried under reduced pressure (2 cm. Hg). 10-(1-benzyl-4-piperidyl)-dibenzo[a,d]cycloheptatriene (7.4 g.) melting at 117–118° is obtained.

The 10-hydroxy - 10 - (1-benzyl-4-piperidyl)dibenzo-[a,d]cycloheptadiene used as the starting material may be obtained in the following manner:

(a) Preparation of 4-(10-hydroxy - 10 - dibenzo[a,d]-cycloheptadienyl)-1-benzyl pyridinium bromide (30.8 g. M.P. about 270°) by reaction of benzyl bromide (17.2 g.) with 10-hydroxy - 10 - (4-pyridyl)dibenzo[a,d]cycloheptadiene (20.0 g.) working in acetonitrile under reflux.

(b) Preparation of 10-hydroxy - 10 - (1-benzyl-4-piperidyl)dibenzo[a,d]cycloheptadiene (M.P.=115–117°, 18.7 g.) by hydrogenation of 4-(10-hydroxy-10-dibenzo-[a,d]cycloheptadienyl)-1-benzyl pyrodinium bromide (27.0 g.) at ordinary pressure and temperature, in aqueous methanol solution, in the presence of an ADAMS platinum catalyst.

Example 3

A solution of 10-hydroxy - 10 - (4-piperidyl)dibenzo-[a,d]cycloheptadiene (8.7 g.) in an aqueous solution of N methanesulphonic acid (120 cc.), is heated under reflux for 4 hours. After cooling to 45°, the solution obtained is rendered alkaline by means of 5 N caustic soda (100 cc.) and is then cooled to 25°. The oil which separates out is extracted with methylene chloride (200 cc.). After washing twice with distilled water (total 200 cc.) the methylene chloride solution is dried over anhydrous sodium sulphate and evaporated. The residue obtained (7.7 g.) is dissolved in boiling acetonitrile (35 cc.). After 24 hours cooling at 3°, the crystals which have appeared are filtered off, washed twice with ice cold acetonitrile (total 15 cc.), and dried under reduced pressure (2 cm. Hg). 10-(4-piperidyl)dibenzo[a,d]cycloheptatriene (6.05 g.) melting at 138–139° is obtained.

10-hydroxy - 10 - (4-piperidyl)dibenzo[a,d]cycloheptadiene (16.8 g. M.P. 250°) is obtained by hydrogenating 10-hydroxy - 10 - (1-benzyl-4-piperidyl)dibenzo[a,d]cycloheptadiene (26.8 g.) in an autoclave at a pressure of 100 bars, at 85°, in an ethanol medium in the presence of palladium on charcoal.

Example 4

A solution of 10-hydroxy-10-[1-(4-methoxybenzyl)-4-piperidyl]dibenzo[a,d]cycloheptadiene (11.3 g.) in pure acetic acid (50 cc.) is treated with distilled water (100 cc.) followed by an aqueous solution of 2 N methanesulphonic acid (50 cc.). The homogeneous reaction mixture is heated under reflux for 3 hours. After cooling to 60°, the solution obtained is poured over a mixture of crushed ice (150 g.) and 10 N caustic soda (80 cc.). The oil which separates out is extracted with methylene chloride (200 cc.). After washing twice with distilled water (total 280 cc.), the methylene chloride solution is dried over anhydrous sodium sulphate and evaporated. The residue obtained (10.0 g.) is dissolved in boiling diisopropyl ether (65 cc.). After 20 hours cooling at 3°, the crystals which appear are filtered off, washed twice with ice cold diisopropyl ether (total 20 cc.) and dried under reduced pressure (2 cm. Hg). 10-[1-(4-methoxybenzyl)-4-piperidyl]dibenzo[a,d]cycloheptatriene (9.1 g.) melting at 127° is obtained.

The 10-hydroxy-10-[1-(4-methoxybenzyl)-4-piperidyl] dibenzo[a,d]cycloheptadiene used as the starting material may be prepared in the following manner:

(a) Preparation of 4-(10-hydroxy-10-dibenzo[a,d]cycloheptadienyl)-1-(4-methoxybenzyl)pyridinium chloride (14.1 g. M.P. 181–189°) by reaction of 4-methoxybenzyl chloride (7.0 g.) with 10-hydroxy-10-(4-pyridyl)dibenzo[a,d]cycloheptadiene (10.0 g.) working in acetonitrile under reflux.

(b) Preparation of 10-hydroxy-10[1-(4-methoxybenzyl) - 4 - piperidyl]dibenzo[a,d]cycloheptadiene (M.P.= 121–126°, 9.3 g.) by hydrogenation of 4-(10-hydroxy-10-dibenzo[a,d]cycloheptadienyl) - 1 - 1(4-methoxybenzyl)-pyridinium chloride (13.9 g.) at ordinary temperature and at a pressure of 50 bars in an aqueous ethanol medium in the presence of an Adams platinum catalyst.

Example 5

A solution of 2-methoxy-11-hydroxy-11-(1-methyl-4-piperidyl)dibenzo[a,d]cycloheptadiene (1.27 g.) in an N aqueous solution of methanesulphonic acid (20 cc.) is heated under reflux for 75 minutes. The solution obtained is rendered alkaline after cooling by the addition of 10 N caustic soda (5 cc.). The oil which separates out is twice extracted with diethyl ether (total 60 cc.). The combined organic solutions are dried over anhydrous potassium carbonate and evaporated. The residue obtained (1.2 g.) is dissolved in boiling diisopropyl ether (8 cc.). After 17 hours cooling at 3°, the crystals which have appeared are filtered off, washed with ice cold diisopropyl ether (2 cc.) and dried under reduced pressure (2 cm. Hg). 2 - methoxy - 11 - (1-methyl-4-piperidyl)dibenzo [a,d]cycloheptatriene (0.84 g.) melting at 131–132° is obtained.

The 2-methoxy-11-hydroxy-11-(1-methyl-4-piperidyl) dibenzo[a,d]cycloheptadiene used as the starting material may be obtained in the following manner:

(a) Preparation of 2-(4-methoxybenzoyl)benzoic acid according to Lin-Che-Kin, A. Ch. 13, 317 (1940).

(b) Preparation of 2-(4-methoxybenzyl)benzoic acid (M.P.=111–112°, 324 g.) by hydrogenation of 2-(4-methoxybenzoyl)benzoic acid (350 g.) under 40 kg. of hydrogen at 70°, in methanol in the presence of palladium on charcoal.

(c) Preparation of methyl 2-(4-methoxybenzoyl)benzoate (B.P. $_{0.3}$=150–160°, 324 g.) by esterification of 2-(4-methoxybenzyl)benzoic acid (324 g.) with methanol in the presence of sulphuric acid.

(d) Preparation of 2-(4-methoxybenzyl)benzyl alcohol (B.P. $_{0.2}$=170–180°, 278.7 g.) by reduction of methyl 2-(4-methoxybenzyl)benzoate (324 g.) by means of lithium aluminium hydride in anhydrous tetrahydrofuran.

(e) Preparation of 2-(4-methoxybenzyl)benzyl chloride (B.P. $_{0.7}$=150–158°, 298 g.) by reaction of thionyl chloride (165.5 g.) with 2-(4-methoxybenzyl)benzyl alcohol (278.7 g.).

(f) Preparation of 2-(4-methoxybenzyl)phenylacetonitrile (M.P.=65°, 266.7 g.) by reaction of potassium cyanide (94 g.) with 2-(4-methoxybenzyl)benzyl chloride (298 g.) in ethanol under reflux.

(g) Preparation of 2-(4-methoxybenzyl)phenylacetic acid (M.P.=70°, 196 g.) by reaction of potassium hydroxide in aqueous ethanol solution with 2-(4-methoxybenzyl)phenylacetonitrile (266.7 g.).

(h) Preparation of 2-methoxy-11-oxo-dibenzo[a,d]cycloheptadiene (M.P.=82–84°, 80 g.) by reaction of a mixture of orthophosphoric acid and phosphorus with 2-(4-methoxybenzyl)phenylacetic acid (154 g.).

(i) Preparation of 2-methoxy-11-hydroxy-11-(4-pyridyl)dibenzo[a,d]cycloheptadiene (M.P.=226°, 16.3 g.) by reaction of 4-pyridyl lithium, (prepared starting with 4-bromopyridine (39.5 g.)) with 2-methoxy-11-oxo-dibenzo[a,d]cycloheptadiene (29.8 g. M.P. 82–84°) working in ether at −70° C.

(j) Preparation of 4-(2-methoxy-11-hydroxy-11-dibenzo[a,d]cycloheptadienyl) - 1 - methyl-pyridinium bromide (M.P.−238–241°, 3.15 g.) (the compound melts at 190–195° if solvated by 1 mole of acetonitrile), by reaction of methyl bromide (26 g.) with 2-methoxy-11-hydroxy - 11 - (4-pyridyl)dibenzo[a,d]cycloheptadiene (3.0 g.) working in acetonitrile at 80° C.

(k) Preparation of 2-methoxy-11-hydroxy-11-(1-methyl-4-piperidyl) - dibenzo[a,d]cycloheptadiene (M.P.= 170°, 1.20 g.) by hydrogenation of 4-(2-methoxy-11-hydroxy-11-dibenzo[a,d]cycloheptadienyl) - 1 - methyl-pyridinium bromide (2.26 g.) at ordinary pressures and temperatures, in an aqueous ethanol medium, in the presence of an Adams platinum catalyst.

Example 6

10-(1-benzyl-4-piperidyl)dibenzo[a,d]cycloheptatriene, (29.4 g.) prepared as described in Example 2, are dissolved in ethanol (600 cc.) and hydrogenated at a pressure of 100 bars, at 80–85° C., for 8 hours in the presence of 10 g. palladium on charcoal (containing 3% palladium). After filtering off the catalyst and evaporating the solvents, the crystalline residue obtained (22 g.) is recrystallised from acetonitrile (70 cc.). After filtering and washing with ice cold acetonitrile (10 cc.) the crystals are dried under reduced pressure (20 mm. Hg). 10-(4-piperidyl)dibenzo[a,d]cycloheptatriene (19 g.) melting at 138° C., is obtained.

Example 7

10-(4-piperidyl)dibenzo[a,d]cycloheptatriene (8.5 g.), ethyl iodide, (5 g.), sodium bicarbonate, 2.7 g.), and dimethylformamide (100 cc.) are heated for 4 hours at 90° C. followed by heating for 4 hours at 140° C. After evaporation of the solvents under reduced pressure, (20 mm. Hg) the residue obtained is treated with distilled water (150 cc.) and benzene (100 cc.). The decanted aqueous solution is washed twice with benzene (total 100 cc.). The combined benzene solutions are dried over anhydrous sodium sulphate and evaporated. The residue obtained 6.9 g.) is subjected to chromatography on alumina (100 g.) in a mixture of benzene/cyclohexane (20/80 by volume). After elution by means of 2000 cc. of this mixture, and evaporation, an oily product (5.1 g.) is obtained which is dissolved in boiling acetonitrile (30 cc.). After cooling at 5° C. for 2 hours, the crystals which have appeared are filtered off, washed twice with ice cold acetonitrile (total 10 cc.), and dried under reduced pressure. 10 - (1-ethyl-4-piperidyl)dibenzo[a,d]cycloheptatriene (4.3 g.) melting at 110° C., is obtained.

Example 8

10 - (4 - piperidyl)dibenzo[a,d]cycloheptatriene (8.25 g.), normal propyl bromide (3.9 g.), sodium bicarbonate (2.7 g.), and dimethylformamide (100 cc.) are heated at 110° C. for 3 hours followed by heating at 130–140° C. for 5 hours. After evaporating the solvents under reduced pressure (20 mm. Hg) and carrying out the same treatment as in Example 7, 7.7 g. of product are obtained after chromatography; this is treated with a boiling solution of maleic acid (3.6 g.) in isopropanol (100 cc.). After 2 hours cooling at 5° C. the crystals which have appeared are filtered off, washed twice with ice cold isopropanol (total 20 cc.), and dried under reduced pressure (20 mm. Hg). 10-(1-n-propyl-4-piperidyl)dibenzo[a,d]cycloheptatriene maleate (8.5 g.) melting at 138–140° C., is obtained.

Example 9

10-(4-piperidyl)dibenzo[a,d]cycloheptatriene (6.9 g.), allyl chloride (2 g.), sodium bicarbonate (4.2 g.), and dimethylformamide (60 cc.) are heated at 60° C. for 16 hours followed by heating at 125° C. for 1 hour. After evaporating the solvents under reduced pressure (20 mm. Hg), the residue obtained is treated with distilled water (100 cc.) and benzene (100 cc.). The benzene solution is decanted, washed with distilled water until neutral and evaporated. The residue (7.4 g.) is treated with maleic acid (3.2 g.) dissolved in boiling isopropanol (100 cc.). After the usual isolation procedure, 10-(1-allyl-4-piperidyl)dibenzo[a,d]cycloheptatriene maleate (8.9 g.) is obtained; this product melts at 164–166° C. and at 182–184° C. after recrystallisation.

Example 10

10-(4-piperidyl)dibenzo[a,d]cycloheptatriene (6.9 g.), propargyl chloride (2 g.), sodium bicarbonate (4.2 g.), and dimethylformamide (60 cc.), are heated for 3 hours at 65° C., followed by heating for 3 hours at 85° C. and finally for 4 hours at 130° C. After the usual treatment and carrying out chromatography, the product obtained (3.6 g.) is recrystallised from a mixture consisting of isopropanol (5 cc.) and acetonitrile (5 cc.). After the usual isolation procedure, 10-(1-propargyl-4-piperidyl) dibenzo[a,d]cycloheptatriene (2.9 g.) melting at 124–125° C. is obtained.

Example 11

10 - (4 - piperidyl)dibenzo[a,d]cycloheptatriene (8.25 g.), glycol chlorhydrin (2.55 g.), sodium bicarbonate (2.7 g.), and dimethylformamide (100 cc.), are heated at 130° C. for 8 hours. After the usual treatment and carrying out chromatography, the product obtained (8.7 g.) is crystallised from cyclohexane (130 cc.). After the usual isolation procedure, 6 g. of product melting at 88–90° C. are obtained. Purification is carried out by converting the product to the maleate in isopropanol (M.P.=134–135° C.) and then reconverting it to the base. The product is finally recrystallised from acetonitrile. 10-[1-(2-hydroxyethyl)-4-piperidyl]dibenzo[a,d]cycloheptatriene (3.4 g.) melting at 116–117° C. is obtained.

Example 12

10-(4-piperidyl)dibenzo[a,d]cycloheptatriene (6.6 g.), 2-(2-chloroethoxy)ethanol (3.6 g.), sodium bicarbonate (4.2 g.), and dimethylformamide (85 cc.), are heated at 130° C. for 6 hours. After the usual treatment, 8 g. of crude product are isolated and this is purified by two recrystallisations from cyclohexane followed by acetonitrile. 10-[1-(2'-hydroxy-2-ethoxyethyl)-4-piperidyl]dibenzo[a,d]cycloheptatriene (5.1 g.) melting at 115–116° C. is obtained.

Example 13

A solution of 2-methoxy-11-hydroxy-11-[1-(4-methoxybenzyl)-4-piperidyl]dibenzo[a,d]cycloheptadiene (10.2 g.) in a mixture consisting of acetic acid (50 cc.), distilled water (100 cc.), and 2 N aqueous methanesulphonic acid (50 cc.), is heated under reflux for 3 hours.

After cooling, the reaction mixture is treated with distilled water (100 cc.), ice (400 g.), ether (250 cc.), and 10 N caustic soda (150 cc.). The aqueous solution is decanted and washed with ether (250 cc.). The combined ethereal solutions are dried over anhydrous potassium carbonate and evaporated. The oily residue (9.8 g.), dissolved in ethanol (70 cc.), is treated with a solution of fumaric acid (2.6 g.) with 50 cc. of ethanol. Thereafter ether (120 cc.) is added. After 17 hours cooling at 3° C., the crystals which have appeared are filtered off, washed twice with a total of 40 cc. of a mixture of ether and ethanol (1/1 by volume) followed by ether (30 cc.), and dried under reduced pressure (20 mm. Hg). 2 - methoxy - 11 - [1 - (4 - methoxybenzyl)-4-piperidyl] dibenzo[a,d]cycloheptatriene fumarate (11.6 g.) melting at 178–181° C., is obtained.

The 2-methoxy-11-hydroxy-11-[1-(4-methoxybenzyl)-4-piperidyl]dibenzo[a,d]cycloheptadiene starting material may be prepared in the following manner:

(a) Preparation of 2-methoxy-11-hydroxy-11-(4-pyridyl)dibenzo[a,d]cycloheptadiene (M.P.=226° C.) as described in Example 5.

(b) Preparation of 4-(11-hydroxy-2-methoxy-11-dibenzo[a,d]cycloheptadienyl)-1-(4-methoxybenzyl)pyridinium chloride, (M.P.=170–190° C., 19.7 g.) by reaction of 4-methoxybenzyl chloride (9.1 g.) with 2-methoxy-11-hydroxy-11-(4-pyridyl)dibenzo[a,d]cycloheptadiene (13.3 g.) in acetonitrile under reflux.

(c) Preparation of 2-methoxy-11-hydroxy-11-[1-(4-methoxybenzyl)-4-piperidyl]dibenzo[a,d]cycloheptadiene (M.P.=151–152° C., 11.4 g.) by hydrogenation of 4-(2-methoxy-11-hydroxy-11-dibenzo[a,d]cycloheptadienyl)-1-(4-methoxybenzyl)pyridinium chloride (19 g.) at a pressure of 50 bars, at ordinary temperature, in an aqueous ethanol medium, in the presence of an Adams platinum catalyst.

Example 14

A solution of 2-methylthio-11-hydroxy-11-(1-methyl-4-piperidyl)dibenzo[a,d]cycloheptadiene (12.9 g.) in N aqueous methanesulphonic acid (300 cc.), is heated for 4 hours under reflux. After cooling, the reaction mixture is treated with 10 N caustic soda (80 cc.) and ether (250 cc.). The decanted aqueous solution is washed with ether (250 cc.) and the combined ethereal solutions are dried over anhydrous potassium carbonate and evaporated. The residue obtained (12.2 g.) is dissolved in boiling acetonitrile (35 cc.). After 5 hours cooling at 3° C., the crystals which have appeared are filtered off, washed twice with ice cold acetonitrile (total 14 cc.), and dried under reduced pressure (20 mm. Hg). 2-methylthio-11-(1-methyl-4-piperidyl)dibenzo[a,d]cycloheptatriene (10.95 g.) melting at 106–107° C. is obtained.

The 2 - methylthio - 11-hydroxy-11-(1-methyl-4-piperidyl)dibenzo[a,d]cycloheptadiene starting material may be prepared in the following manner:

(a) Preparation of 2 - methylthio-11-hydroxy-11-(4-pyridyl)dibenzo[a,d]cycloheptadiene (M.P.=244–245° C., 28 g.) by reaction with 4-pyridyl lithium (prepared from 63.2 g. of 4-bromopyridine) with 2-methylthio-11-oxo-dibenzo[a,d]cycloheptadiene (50.8 g.) the reaction being carried out in ether at −70° C.

(b) Preparation of 4-(2-methylthio-11-hydroxy-11-dibenzo[a,d]cycloheptadienyl)-1-methyl pyridinium bromide (M.P.=208–212° C., 23.2 g.) by reaction of methyl bromide (130 g.) with 2-methylthio-11-hydroxy-11-(4-pyridyl)dibenzo[a,d]cycloheptadiene (20 g.) in acetonitrile at 80° C.

(c) Preparation of 2 - methylthio - 11 - hydroxy - 11-(1 - methyl - 4 - piperidyl)dibenzo[a,d]cycloheptadiene (M.P.=131–132° C. 13.9 g.) by hydrogenation of 4-(2-methylthio - 11 - hydroxy - 11 - dibenzo[a,d]cycloheptadienyl)-1-methyl pyridinium bromide (20 g.) at a pressure of 60 bars, at ordinary temperature, in an aqueous ethanol medium, in the presence of an Adams platinum catalyst.

(d) The 2 - methylthio - 11 - oxo-dibenzo[a,d]cycloheptadiene melting at 104° C. which is used in this preparation may itself be prepared by carrying out the process as for 2 - methoxy - 11-oxo-dibenzo[a,d]cycloheptadiene but starting with: 2-(4-methylthiobenzoyl)benzoic acid and successively producing the following products:

2-(4-methylthiobenzyl)benzoic acid, M.P. 129° C.
Methyl 2-(4-methylthiobenzyl)benzoate
2-(4-methylthiobenzyl)benzyl alcohol, M.P. 70° C.
2-(4-methylthiobenzyl)benzyl chloride.
2-(4-methylthiobenzyl)phenylacetonitrile, M.P. 75–76°C.
2-(4-methylthiobenzyl)phenylacetic acid, M.P. 138° C., this last product being cyclised to 2-methylthio-11-oxo-dibenzo[a,d]cycloheptadiene by heating in the presence of a mixture of orthophosphoric acid and phosphorus pentoxide.

Example 15

A solution of 2-methylthio-11-hydroxy-11-(1-ethyl-4-piperidyl)dibenzo[a,d]cycloheptadiene (5.5 g.) in N aqueous methanesulphonic acid (120 cc.) is heated for 4 hours under reflux. After carrying out the same treatment as in the preceding Example, 5.2 g. of product are obtained and this is treated with fumaric acid (1.8 g.) dissolved in ethanol (40 cc.). After cooling and isolating in the usual manner, 2-methylthio-11-(1-ethyl-4-piperidyl)dibenzo[a,d]cycloheptatriene fumarate (5.3 g.) melting at 178–181° C. is obtained.

The 2 - methylthio-11-hydroxy-11-(1-ethyl-4-piperidyl) dibenzo[a,d]cycloheptadiene starting material may be prepared in the following manner:

(a) Preparation of 4 - (2 - methylthio-11-hydroxy-11-dibenzo[a,d]cycloheptadienyl)-1-ethyl pyridinium bromide (M.P.=190–195° C., 9.5 g.) by reaction of ethyl bromide (8.4 g.) with 2 - methylthio - 11 - hydroxy - 11 - (4-pyridyl)dibenzo[a,d]cycloheptadiene (7.8 g.) this product having been prepared as indicated in the preceding example, the process being carried out in acetonitrile at 80° C.

(b) Preparation of 2 - methylthio - 11-hydroxy-11-(1-ethyl - 4 - piperidyl)dibenzo[a,d]cycloheptadiene M.P.= 108–109° C., 4.89 g.) by hydrogenation of 4-(2-methylthio - 11 - hydroxy-11-dibenzo[a,d]cycloheptadienyl)-1-ethyl pyridinium bromide (7 g.) at a pressure of 60 bars, at ordinary temperature, in an aqueous ethanol medium in the presence of an Adams platinum catalyst.

Example 16

2-chloro-11-hydroxy-11-(1-methyl-4-piperidyl)dibenzo [a,d]cycloheptadiene (15 g.) are heated under reflux for 2 hours in 2 N aqueous methanesulphonic acid (70 cc.), diluted with distilled water (200 cc.). After the usual treatment 13.8 g. of crude product are obtained and this product is dissolved in boiling diisopropyl ether (40 cc.). After cooling and isolating the crystals which have appeared, in the usual manner, 2-chloro-11-(1-methyl-4-piperidyl)dibenzo[a,d]cycloheptatriene (10.5 g.) melting at 96–97° C. is obtained.

The 2 - chloro - 11-hydroxy-11-(1-methyl-4-piperidyl) dibenzo[a,d]cycloheptadiene starting material may be prepared in the following manner:

(a) Preparation of 2-chloro-11-hydroxy-11-(4-pyridyl) dibenzo[a,d]cycloheptadiene (M.P.=238° C. 40 g.) by reaction of 4-pyridyl lithium (prepared starting from 92.5 g. of 4-bromopyridine) with 2-chloro-11-oxo-dibenzo[a,d]cycloheptadiene (70 g.) in ether at −70° C.

(b) Preparation of 4 - (2 - chloro-11-hydroxy-dibenzo [a,d]cycloheptadienyl) - 1 - methyl pyridinium bromide (M.P.=214–220° C., 24.6 g.) by reaction of methyl bromide (86 g.) with 2-chloro-11-hydroxy-11-(4-pyridyl) dibenzo[a,d]cycloheptadiene (20 g.) in acetonitrile at 80° C.

(c) Preparation of 2 - chloro - 11 - hydroxy - 11 - (1-methyl-4-piperidyl)dibenzo[a,d]cycloheptadiene (M.P.= 239–240° C., 16.9 g.) by hydrogenation of 4-(2-chloro-11 - hydroxy-11-dibenzo[a,d]cycloheptadienyl)-1-methyl pyridinium bromide referred to above, at ordinary pressures and temperatures, in an aqueous ethanol medium, in the presence of an Adams platinum catalyst.

(d) The 2-chloro-11-oxo-dibenzo[a,d]cycloheptadiene (melting at 104° C.) used in this preparation may be prepared by proceeding as in the case of 2-methoxy-11-oxo-dibenzo[a,d]cycloheptadiene but starting with 2-(4-chlorobenzyl)benzoic acid (M.P.=130° C.) and successively preparing the following products:

Methyl 2 - (4 - chlorobenzyl)benzoate distilling at 170–175° C. at a reduced pressure of 0.3 mm. Hg.

2-(4-chlorobenzyl)benzyl alcohol distilling at 180–184° C. at a reduced pressure of 0.35 mm. Hg.

2-(4-chlorobenzyl)benzyl bromide melting at 58° C.

2 - (4 - chlorobenzyl)phenylacetonitrile distilling at 168–170° C. at a reduced pressure of 0.3 mm. Hg.

2-(4-chlorobenzyl)phenylacetic acid melting at 140° C., this last product being cyclised to 2-chloro-11-oxo-dibenzo[a,d]cycloheptadiene by heating in the presence of a mixture of orthophosphoric acid and phosphorus pentoxide.

Example 17

A solution of 2-chloro-11-hydroxy-11-(1-benzyl-4-piperidyl)-dibenzo[a,d]cycloheptadiene (9.6 g.) in acetic acid (45 cc.), destilled water, (30 cc.), and 2 N aqueous methanesulphonic acid (40 cc.) is heated under reflux for 4 hours. After the usual treatment the crude product obtained is recrystallised from acetonitrile. After the usual isolation procedure, 2-chloro-11-(1-benzyl-4-piperidyl)dibenzo[a,d]cycloheptatriene (6.37 g.) melting at 152–153° C. is obtained.

The 2-chloro-11-hydroxy-11-(1-benzyl - 4 - piperidyl) dibenzo[a,d]cycloheptadiene starting material may be prepared in the following manner:

(a) Preparation of 4-(2-chloro-11-hydroxy-11-dibenzo [a,d]cycloheptadienyl) 1 - benzyl pyridinium bromide (M.P.=195–205°, 18.4 g.) by reaction of benzyl bromide (8.55 g.) with 2-chloro-11-hydroxy-11-(4-pyridyl) dibenzo[a,d]cycloheptadiene, (12.9 g.) in acetonitrile under reflux.

(b) Preparation of 2-chloro-11-hydroxy-11-(1-benzyl-4 - piperidyl)dibenzo[a,d]cycloheptadiene (M.P.=230–235° C., 9.8 g.) by hydrogenation of 4-(2-chloro-11-hydroxy-11-dibenzo[a,d]cycloheptadienyl) - 1 - benzyl-pyridinium bromide (17.3 g.) at ordinary pressures and temperatures in an aqueous ethanol medium in the presence of an Adams platinum catalyst.

Example 18

A solution of 2-chloro-11-hydroxy-11-[1-(4-methoxy-benzyl)-4-piperidyl]dibenzo[a,d]cycloheptadiene (17.9 g.) in acetic acid (90 cc.), and N aqueous methanesulphonic acid (200 cc.) is heated under reflux for 5 hours. After the usual treatment 15 g. of a crude product are obtained and this is treated with a solution of fumaric acid (4.1 g.) in ethanol (150 cc.). After the usual isolation of the crystals which have appeared, 2-chloro-11-[1-(4 - methoxybenzyl) - 4 - piperidyl]dibenzo[a,d]cycloheptatriene fumarate (12.4 g.) melting at 220–222° C. are obtained.

The 2-chloro - 11 - hydroxy-11-[1-(4-methoxybenzyl)-4-piperidyl]dibenzo[a,d]cycloheptadiene starting material may be prepared in the following manner:

(a) Preparation of 4-(2-chloro-11-hydroxy-11-dibenzo [a,d]cycloheptadienyl) - 1 - (4-methoxybenzyl)pyridinium bromide (M.P.=250–255° C. 21.6 g.) by reaction of 4-methoxybenzyl bromide (11.7 g.) with 2-chloro-11-hydroxy - 11 - (4-pyridyl)dibenzo[a,d]cycloheptadiene, (14.45 g.) in acetonitrile under reflux.

(b) Preparation of 2-chloro - 11 - hydroxy-11-[1-(4 - methoxybenzyl) - 4 - piperidyl]dibenzo[a,d]cycloheptadiene (a crude oil) (18.1 g.) by hydrogenation of 4-(2-chloro - 11 - hydroxy - 11 - dibenzo[a,d]cycloheptadienyl)-1-(4-methoxybenzyl)pyridinium bromide (20.5 g.) at ordinary temperatures and pressures in an aqueous ethanol medium in the presence of an Adams platinum catalyst.

Example 19

A solution of 2 - bromo-11-hydroxy-11-(1-methyl-4-piperidyl)dibenzo[a,d]cycloheptadiene (29.3 g.) in N aqueous methanesulphonic acid (300 cc.), is heated under reflux for 3 hours. After the usual treatment, 28.2 g. of crude product are obtained and this is recrystallised from a mixture consisting of ethanol (100 cc.) and distilled water (40 cc.). After the usual isolation treatment, 2-bromo-11-(1-methyl - 4 - piperidyl)dibenzo[a,d]cycloheptatriene (25.7 g.) melting at 108–109° C. is obtained.

The 2-bromo - 11 - hydroxy-11-(1-methyl-4-piperidyl) dibenzo[a,d]cycloheptadiene starting material may be prepared in the following manner:

(a) Preparation of 2-bromo-11-hydroxy-11-(4-pyridyl) dibenzo[a,d]cycloheptadiene (M.P.=263° C., 40.7 g.) by reaction of 4-pyridyl lithium (prepared from 79 g. of 4-bromopyridine) with 2-bromo - 11 - oxo-dibenzo[a,d] cycloheptadiene (71.8 g.) in ether at −70° C.

(b) Preparation of 4-(2-bromo-11-hydroxy-11-dibenzo [a,d]cycloheptadienyl) - 1 - methyl pyridinium bromide (M.P.=231–234° C., 48.1 g.) by reaction of methyl bromide (70 g.) with 2-bromo-11-hydroxy-11-(4-pyridyl) dibenzo[a,d]cycloheptadiene (40 g.) in acetonitrile at 80° C.

(c) Preparation of 2-bromo - 11 - hydroxy-11-(1-methyl-4-piperidyl)dibenzo[a,d]cycloheptadiene (M.P.= 234° C., 24.7 g.) by hydrogenation of 4-(2-bromo-11-hydroxy - 11 - dibenzo[a,d]cycloheptadienyl)-1-methyl pyridinium bromide (34.2 g.) at a pressure of 50 bars, at ordinary temperature, in an aqueous ethanol medium in the presence of an Adams platinum catalyst.

(d) The 2-bromo-11-oxo-dibenzo[a,d]cycloheptadiene (melting at 106° C.) used in this preparation may itself be prepared like 2-chloro-11-oxo-dibenzo[a,d]cycloheptadiene( but starting from 2-(4-bromo-benzyl)benzoic acid and successively preparing the following products:

Methyl 2-(4-bromobenzyl)benzoate M.P. 56° C.

2-(4-bromobenzyl)benzyl alcohol (B.P.$_{0.2}$=165–167° C.)

2-(4-bromobenzyl)benzyl bromide M.P. 72° C.

2-(4-bromobenzyl)phenylacetonitrile (B.P.$_{0.5}$=175–178° C.)

2-(4-bromobenzyl)phenylacetic acid M.P. 166° C., this last compound being cyclised by heating in the presence of orthophosphoric acid and phosphorus pentoxide Example 20

A solution of 2-methyl-11-hydroxy-11-(1-methyl-4-piperidyl)dibenzo[a,d]cycloheptadiene (10 g.) in 0.5 N aqueous methanesulphonic acid (200 cc.) is heated under reflux for 150 minutes. After cooling, the reaction mixture is treated with 10 N caustic soda (20 cc.) and ether (150 cc.). The decanted aqueous solution is extracted 3 times with ether (total 450 cc.). The combined ethereal solutions are washed twice with distilled water (total 200 cc.), dried over anhydrous sodium sulphate and evaporated. The residue (9.6 g.) is dissolved in boiling hexane (30 cc.). After 30 minutes cooling at 5° C., the crystals which have appeared are filtered off, washed with ice cold hexane (5 cc.), and dried under reduced pressure (20 mm. Hg). 2-methyl-11-(1-methyl - 4 - piperidyl)dibenzo [a,d]cycloheptatriene (8.54 g.) melting at 100–101° C. is obtained.

The 2-methyl - 11 - hydroxy-11-(1-methyl-4-piperidyl) dibenzo[a,d]cycloheptadiene starting material may be prepared in the following manner:

(a) Preparation of 2-methyl-11-hydroxy-11-(4-pyridyl) dibenzo[a,d]cycloheptadiene (M.P.=240–241° C., 12.4 g.) by reaction of 4-pyridyl lithium (prepared starting from 23.7 g. of 4-bromopyridine) with 2-methyl-11-oxo-dibenzo[a,d]cycloheptadiene (16.65 g.) the process being carried out in ether at −70° C.

(b) Preparation of 4-(2-methyl-11-hydroxy-11-dibenzo [a,d]cycloheptadienyl) - 1 - methyl pyridinium bromide (M.P.=220–222° C., 14.25 g.) by reaction of methyl bromide (30 g.) with 2 - methyl - 11 - hydroxy-11-(4-pyridyl)dibenzo[a,d]cycloheptadiene (12.2 g.) in acetonitrile at 80° C.

(c) Preparation of 2 - methyl - 11 - hydroxy-11-(1-methyl-4-piperidyl)dibenzo[a,d]cycloheptadiene M.P.= 217–219° C., 10.1 g.) by hydrogenation of 4-(2-methyl-11 - hydroxy-11-dibenzo[a,d]cycloheptadienyl)-1-methyl pyridinium bromide (14 g.) at ordinary pressures and temperatures, in an aqueous ethanol medium, in the presence of an Adams platinium catalyst.

(d) The 2-methyl-11-oxo-dibenzo[a,d]cycloheptadiene (melting at 65° C.) used in this preparation may itself be prepared by the same process as for the other products of the same type described previously, but starting with 2-(4-methylbenzyl)benzyl alcohol and successively preparing the following intermediates:

2-(4-methylbenzyl)benzyl bromide M.P. 64° C.
2-(4-methylbenzyl) phenylacetonitrile M.P. 40° C.
2-(4-methylbenzyl)phenylacetic acid M.P. 124° C., the last product being cyclised to 2-methyl-11-oxo-dibenzo [a,d]cycloheptadiene by heating in the presence of polyphosphoric acid.

Example 21

A solution of 3-chloro-11-hydroxy-11-(1-methyl-4-piperidyl)-dibenzo[a,b]cycloheptadiene (0.8 g.) in 0.5 N aqueous methanesulphonic acid (20 cc.) is heated under reflux for 150 minutes. After cooling, the reaction mixture is treated with distilled water (15 cc.), 10 N caustic soda (7 cc.), and ether, (50 cc.). The aqueous solution is decanted and extracted twice with ether (total 100 cc.). The combined ethereal solutions are washed twice with distilled water (total 30 cc.), dried over anhydrous potassium carbonate and evaporated. The crystalline residue (0.75 g.) is recrystallised from acetonitrile (5 cc.). 3-chloro - 11 - (1 - methyl-4-piperidyl)dibenzo[a,d]cycloheptatriene (0.61 g.) melting at 147° C. is obtained.

The 3 - chloro-11-hydroxy-11-(1-methyl-4-piperidyl) dibenzo-[a,d]cycloheptadiene starting material may be prepared in the following manner:

(a) Preparation of 3 - chloro - 11 - hydroxy - 11-(4-pyridyl)dibenzo-[a,d]cycloheptadiene (M.P.=255° C., 8.7 g.) by reaction of 4-pyridyl lithium (prepared starting from 11.9 g. of 4-bromopyridine) with 3-chloro-11-oxo-dibenzo[a,d]cyclohaptadiene (9.1 g.) the process being carried out in ether at −70° C.

(b) Preparation of 4-(3-chloro - 11 - hydroxy-11-dibenzo[a,d] - cycloheptadienyl) - 1 - methyl pyridinium bromide (M.P.=220–230° C., 2.25 g.) by reaction of methyl bromide (3 g.) with 3-chloro-11-hydroxy-11-(4-pyridyl)dibenzo[a,d]cycloheptadiene (2 g.) in acetonitrile at 80° C.

(c) Preparation of 3-chloro-11-hydroxy-11-(1-methyl-4-piperidyl) - dibenzo[a,d]cycloheptadiene (M.P.=153° C., 1.1 g.) by hydrogenation of 4-(3-chloro-11-hydroxy-11 - dibenzo[a,d]cycloheptadienyl)-1-methyl pyridinium bromide (1.83 g.) at ordinary pressures and temperatures, in an aqueous ethanol medium, in the presence of an Adams platinum catalyst.

(d) The 3-chloro-11-oxo-dibenzo[a,d]cycloheptadiene (metling at 130° C.) which is used in these preparations may itself be obtained by proceeding as for the other products of the same type described previously, but strating with phenylmagnesium bromide and phthalic anhydride and successively preparing the following intermediates:

2-(3-chlorobenzoyl)benzoic acid, M.P. 160° C.
2-(3-chlorobenzoyl)benzoic acid, M.P. 105° C.
Methyl 2-(3-chlorobenzyl)benzoate
(B.P.$_{0.25}$=149–150° C.)
2-(3-chlorobenzyl)benzyl alcohol
(B.P$_{0.3}$=162–164° C.)
2-(3-chlorobenzyl)benzyl bromide
2-(3-chlorobenzyl)phenylacetonitrile M.P. 56–57° C.
2-(3-chlorobenzyl)phenylacetic acid M.P. 87–88° C., the last compound being cyclised to 3-chloro-11-oxo-dibenzo[a,d]cycloheptadiene by heating in the presence of polyphosphoric acid.

Example 22

4 - chloro - 11 - hydroxy-11-(1-methyl-4-piperidyl)dibenzo[a,d]-cycloheptadiene (0.8 g.) treated as in Example 21 yields 0.75 g. of crude product which after recrystallisation from acetonitrile (2 cc.), yields 4-chloro-11 - (1-methyl-4-piperidyl)dibenzo[a,d]cycloheptatriene (0.51 g) melting at 127° C.

The 4-chloro-11-hydroxy-11-(1-methyl-4-piperidyl)dibenzo-[a,d]cycloheptadiene starting material may be prepared in the following manner:

(a) Preparation of 4 - chloro - 11 - hydroxy - 11-(4-pyridyl)dibenzo-[a,d]cycloheptadiene (M.P.=218° C., 1.75 g.) by reaction of 4-pyridyl lithium (prepared starting from 7.9 g. of 4-bromopyridine) with 4-chloro-11-oxo-dibenzo[a,d]cycloheptadiene (6.1 g.) the process being carried out in ether at −70° C.

(b) Preparation of 4-(4-chloro - 11 - hydroxy-11-dibenzo[a,d]cycloheptadienyl) - 1 - methyl pyridinium bromide (M.P.=250–252° C., 1.35 g.) by reaction of methyl bromide (2.5 g.) with 4-chloro-11-hydroxy-11-(4-pyridyl)dibenzo[a,d]cycloheptadiene (1.5 g.) in acetonitrile at 80° C.

(c) Preparation of 4-chloro-11-hydroxy-11-(1-methyl-4-piperidyl) - dibenzo[a,d]cycloheptadiene (M.P.=212° C., 0.77 g.) by hydrogenation of 4-(4-chloro-11-hydroxy-11 - dibenzo[a,d]cycloheptadienyl)-1-methyl pyridinium bromide (1.07 g.) at ordinary pressures and temperatures, in an aqueous ethanol medium, in the presence of an Adams platinum catalyst.

(d) The 4-chloro-11-oxo-dibenzo[a,d]cycloheptadiene (melting at 112° C.) which is used in this preparation may itself be obtained in the following manner:

(i) Preparation of 3 - (2 - chlorophenyl)phthalide (M.P.=111–112° C., 59.1 g.) by reaction of (2-chlorophenyl)magnesium bromide in tetrahydrofuran with 2-formylbenzoic acid (82.5 g.)

(ii) Preparation of 2-(2-chlorobenzyl)benzoic acid, (M.P.=133° C., 82.6 g.) by reduction of 3-(2-chlorophenyl)phthalide (87.0 g.) by zinc powder in an ammoniacal medium.

(iii) Preparation of methyl 2-(2-chlorobenzyl)benzoate (B.P.$_{0.1}$=140–145° C., 88.7 g.) by reaction of methanol under reflux, in the presence of sulphuric acid, with 2-(2-chlorobenzyl)benzoic acid (94.0 g.)

(iv) Preparation of 2-(2-chlorobenzyl)benzyl alcohol (M.P.=75–76° C., 29.9 g.) by reduction of methyl 2-(2- chlorobenzyl)benzoate (34.6 g.) by means of lithium aluminium hydride in anhydrous ether.

(v) Preparation of 2-(2-chlorobenzyl)benzyl bromide (B.P.$_{0.05}$=138–140° C., 85.7 g.) by reaction of aqueous 48% hydrobromic acid under reflux with 2-(2-chlorobenzyl)benzyl alcohol (78 g.).

(vi) Prepartion of [2-(2 - chlorobenzyl)phenyl]acetonitrile (M.P.=64° C., 21 g.) by reaction of potassium cyanide in an aqueous ethanol medium, under reflux, with 2-(2-chlorobenzyl)benzyl bromide (30.5 g.).

(vii) Preparation of [2-(2-chlorobenzyl)phenyl]acetic acid (M.P=102° C., 40.9 g.) by hydrolysing [2-(2-chlorobenzyl)phenyl]-acetonitrile (41 g.) in an aqueous ethanol medium under reflux, in the presence of potash.

(viii) Preparation of crude [2-(2-chlorobenzyl)phenyl] acetyl chloride (14 g.) by reaction of thionyl chloride (6.3 g.) with [2-(2-chlorobenzyl)phenyl]acetic acid (13.0 g.) in benzene solution.

(ix) Preparation of 4 - chloro-11-oxo-dibenzo[a,d]cycloheptadiene (M.P.=112° C., 8.8 g.) by reaction of aluminum chloride with [2 - (2 - chlorobenzyl)phenyl] acetyl chloride (13.6 g.) in solution in carbon disulphide.

Example 23

A solution of crude 2-chloro-10-hydroxy-10-(1-methyl-4-piperidyl)dibenzo[a,d]cycloheptadiene (1.4 g.) in 0.5 N aqueous methanesulphonic acid (40 cc.), is heated under reflux for 3 hours. After cooling the reaction mixture is diluted with distilled water (50 cc.), and extracted 3 times with ether (total 150 cc.). The aqueous acid solution obtained is treated with 10 N caustic soda (15 cc.) and extracted 5 times with ether (total 250 cc.). These combined ethereal solutions are washed 4 times with distilled water (total 160 cc.), dried over anhydrous sodium sulphate and evaporated. The residue (1.05 g.) is recrystallized from acetonitrile (10 cc.). 2 - chloro - 10- (1 - methyl - 4 - piperidyl)dibenzo[a,d]cycloheptatriene (M.P.=134–136° C., 0.9 g.) is obtained. After a further recrystallisation from ethyl acetate, 0.7 g. of product melting at 140.5–141° C. is obtained.

The crude 2 - chloro-10-hydroxy-10-(1-methyl-4-piperidyl)dibenzo[a,d]cycloheptadiene may be prepared in the following manner:

(a) Preparation of 2-chloro-10-hydroxy-10-(4-pyridyl) dibenzo[a,d]cycloheptadiene (M.P.=250° C., 3.3 g.) by reaction of 4-pyridyl lithium (prepared starting from 7.9 g. of 4-bromopyridine) with 2-chloro-10-oxo-dibenzo[a,d]cycloheptadiene (6 g.) the process being carried out in ether at −70° C.

(b) Preparation of 4-(2-chloro - 10 - hydroxy - 10 - dibenzo[a,d]cycloheptadienyl) - 1 - methyl pyridinium bromide (M.P.=247–249° C., 3.6 g.) by reaction of methyl bromide (5.6 g.) with 2-chloro-10-hydroxy-10-(4-pyridyl) dibenzo[a,d]cycloheptadiene (3.75 g.) in acetonitrile at 80° C.

(c) Preparation of crude 2-chloro - 10 - hydroxy - 10- (1 - methyl - 4 - piperidyl)dibenzo[a,d]cycloheptadiene (M.P.=154–155° C., 1.55 g.) by hydrogenation of 4- (2 - chloro - 10 - hydroxy - 10 - dibenzo[a,d]cycloheptadienyl)-1-methyl pyridinium bromide (2.6 g.) at ordinary pressures and temperatures, in an aqueous ethanol medium, in the presence of an Adams platinum catalyst.

(d) The 2-chloro-10-oxo-dibenzo[a,d]cycloheptadiene (melting at 146–147° C.) used in this preparation may itself be prepared like the other products of the same type previously described, but starting with phenyl magnesium bromide and 2-formyl-5-chloro-benzoic acid and successively preparing the following intermediates:

3-phenyl-6-chloro-phthalide M.P. 94° C.
2-benzyl-5-chlorobenzoic acid M.P. 128–129° C.
Methyl 2-benzyl-5-chloro-benzoate (B.P.$_{0.2}$=155–157.5° C.).
2-benzyl-5-chlorobenzyl alcohol (B.P.$_{0.15}$=146–148° C.).
2-benzyl-5-chlorobenzyl bromide, M.P. 52° C.
(2-benzyl-5-chlorophenyl)acetonitrile M.P. 35° C.

(2-benzyl-5-chlorophenyl)acetic acid, M.P. 114.5–116° C., this last product being cyclised to 2-chloro-10-oxodibenzo[a,d]cycloheptadiene by heating in the presence of polyphosphoric acid.

Example 24

A solution of 3-chloro-10-hydroxy - 10 - (1 - methyl-4-piperidyl)dibenzo[a,d]cycloheptadiene 1.03 g., in 0.5 N aqueous methanesulphonic acid (28 cc.) is heated under reflux for 4 hours. After cooling the reaction mixture is treated with distilled water (50 cc.), methylene chloride (30 cc.), and 10 N caustic soda (15 cc.). The decanted aqueous solution is extracted 6 times with methylene chloride (total 180 cc.). The combined organic solutions are washer 4 times with distilled water (total 120 cc.), dried over anhydrous sodium sulphate and evaporated. The crystalline residue (0.95 g.) is recrystallised from ethanol (5 cc.). 3-chloro-10-(1-methyl-4-piperidyl)dibenzo[a,d] cycloheptatriene (0.6 g.) melting at 139–140° C. is obtained.

The 3-chloro-10-hydroxy-10-(1-methyl-4-piperidyl)dibenzo[a,d]cycloheptadiene may be prepared in the following manner:

(a) Preparation of 3-chloro-10-hydroxy-10-(4-pyridyl) dibenzo[a,d]cycloheptadiene (M.P.=250° C., 3.3 g.) by reaction of 4-pyridyl lithium (prepared from 11.8 g. of 4-bromopyridine) with 3-chloro-10-oxo-dibenzo[a,d]cycloheptadiene (9 g.) the process being carried out in ether at −70° C.

(b) Preparation of 4-(3-chloro-10-hydroxy-10-dibenzo[a,d]cycloheptadienyl) - 1 - methyl pyridinium bromide (M.P.=206° C., 4.7 g.) by reaction of methylbromide (6 g.) with 3-chloro-10-hydroxy-10-(4-pyridyl)dibenzo[a,d]cycloheptadiene (4 g.) in acetonitrile at 80° C.

(c) Preparation of 3-chloro-10-hydroxy-10-(1-methyl-4 - piperidyl) - dibenzo[a,d]cycloheptadiene (M.P.=169–170° C., 1.25 g.) by hydrogenation of 4-(3-chloro-10-hydroxy - 10 - dibenzo[a,d]cycloheptadienyl) - 1 - methyl pyridinium bromide (2.53 g.) at ordinary pressures and temperatures in an aqueous ethanol medium in the presence of an Adams plantinum catalyst.

(d) The 3-chloro-10-oxo-dibenzo[a,d]cycloheptadiene (melting at 96–97° C.) used in this preparation may itself be prepared like the other products of the same type described previously, but starting with 2-benzyl-4-chlorobenzoic acid and successively preparing the following intermediates:

Methyl 2-benzyl - 4 - chlorobenzoate (B.P.$_{0.3}$=147–152° C.).
2-benzyl-4-chlorobenzyl alcohol (B.P.$_{0.15}$=153–155° C.).
2-benzyl - 4 - chlorobenzyl bromide (B.P.$_{0.15}$=148.5–150° C.).
2-benzyl-4-chlorophenyl)acetonitrile, M.P. 74–76° C.
(2-benzyl-4-chlorophenyl)acetic acid, M.P. 157–158° C., the last compound being cyclised to 3-chloro-10-oxodibenzo[a,d]cycloheptadiene by heating in the presence of polyphosphoric acid.

Example 25

A solution of crude 1-chloro-10-hydroxy-10-(1-methyl-4-piperidyl)dibenzo[a,d]cycloheptadiene (2.1 g.) in 0.5 N aqueous methanesulphonic acid (50 cc.), is heated under reflux for 150 minutes. After cooling, the reaction mixture is treated with ether (100 cc.), and 2 N caustic soda (20 cc.). The decanted aqueous solution is extracted 3 times with ether (total 150 cc.). The combined ethereal solutions are washed 4 times with distilled water (total 100 cc.), dried over anhydrous potassium carbonate and evaporated. The residue (2 g.) is recrystallised from acetonitrile (30 cc.). 1-chloro-10-(1-methyl-4-piperidyl)dibenzo[a,d]cycloheptatriene (M.P.=149° C. 1.7 g.) is obtained and this product melts at 156° C. after recrystallisation from ethanol followed by ethyl acetate.

The 1-chloro-10-hydroxy-10-(1-methyl-4-piperidyl)dibenzo[a,d]cycloheptadiene starting material may be prepared in the following manner:

(a) Preparation of 1-chloro-10-hydroxy-10-(4-pyridyl)dibenzo[a,d]cycloheptadiene (M.P.=258° C., 3.5 g.) by reaction of 4-pyridyl lithium (prepared starting from 11 g. of 4-bromopyridine) with 1-chloro-10-oxo-dibenzo[a,d]cycloheptadiene (8.5 g.) the process being carried out in ether at −70° C.

(b) Preparation of 4-(1-chloro-10-hydroxy-10-dibenzo[a,d]cycloheptadienyl) - 1 - methyl pyridinium bromide (M.P.=277° C., 3.65 g.) by reaction of methyl bromide (5.9 g.) with 1-chloro-10-hydroxy-10-(4-pyridyl)dibenzo[a,d]cycloheptadiene (3.4 g.) in acetonitrile at 80° C.

(c) Preparation of crude 1-chloro-10-hydroxy-10-(1-methyl-4-piperidyl)dibenzo[a,d]cycloheptadiene (M.P.= 188–190° C., 1.8 g.) by hydrogenation of 4-(1-chloro-10-hydroxy-10-dibenzo[a,d]cycloheptadienyl)-1-methyl pyridinium brome (3.5 g.) at ordinary pressures and temperatures in an aqueous ethanol medium, in the presence of an Adams platinum catalyst.

(d) The 1-chloro-10-oxo-dibenzo[a,d]cycloheptadiene (melting at 142° C.) which is used in this preparation may itself be prepared like the other products of the same type described previously, but starting with 7-chlorophthalide and successively preparing the following intermediates:

3-bromo-7-chlorophthalide M.P. 93° C.
2-formyl-6-chlorobenzoic acid, M.P. 183–184° C.
3-phenyl-7-chlorophthalide, M.P. 88° C.
2-benzyl-6-chlorobenzoic acid, M.P. 133–134° C.
Methyl 2-benzyl-6-chlorobenzoate (B.P.$_{0.15}$=141–150° C.)
2-benzyl-6-chlorobenzyl alcohol M.P. 65–66° C.
2-benzyl-6-chlorobenzyl bromide (B.P.$_{0.1}$=135–144° C.)
(2-benzyl-6-chlorophenyl)acetonitrile (B.P.$_{0.1}$=145–162° C.)
(2-benzyl-6-chlorophenyl)acetic acid M.P. 132° C., this last product being cyclised to 1-chloro-10-oxo-dibenzo[a,d]cycloheptadiene by heating in the presence of polyphosphoric acid.

Example 26

A solution of 4-chloro-10-hydroxy-10-(1-methyl-4-piperidyl)dibenzo[a,d]cycloheptadiene (0.8 g.) in 0.5 N aqueous methanesulphonic acid (20 cc.), is heated under reflux for 150 minutes. After cooling, the reaction mixture is diluted with distilled water (10 cc.), and is then treated with ether (20 cc.) and 5 N caustic soda (3 cc.). The decanted aqueous solution is extracted twice with ether, (total 40 cc.). The combined ethereal solutions are washed 3 times with distilled water (total 30 cc.), dried over anhydrous magnesium sulphate and evaporated. The residue (0.75 g.), dissolved in ethanol (3 cc.), is treated with fumaric acid (0.27 g.) dissolved in ethanol (3 cc.). After 1 hour's cooling at 3° C., the crystals which have appeared are filtered off, washed with ice cold ethanol (2 cc.) and dried under reduced pressure (20 mm. Hg). 4 - chloro - 10 - (1 - methyl - 4 - piperidyl)dibenzo[a,d]cycloheptatriene fumarate (0.86 g.) melting at 198° C. is obtained.

The 4-chloro-10-hydroxy-10-(1-methyl-4-piperidyl)dibenzo[a,d]cycloheptadiene starting material may be prepared in the following manner:

(a) Preparation of 4-chloro-10-hydroxy-10-(4-pyridyl)dibenzo[a,d]cycloheptadiene (M.P.=260° C., 2.8 g.) by reaction of 4-pyridyl lithium (prepared starting from 6.3 g. of 4-bromopyridine) with 4-chloro-10-oxo-dibenzo[a,d]cycloheptadiene (4.85 g.) the process being carried out in ether at −70° C.

(b) Preparation of 4-(4-chloro-10-hydroxy-10-dibenzo[a,d]cycloheptadienyl) - 1 - methyl pyridinium bromide (M.P.=245° C., 1.85 g.) by reaction of methyl bromide (2.5 g.) with 4-chloro-10-hydroxy-10-,4-pyridyl)dibenzo[a,d]cycloheptadiene (1.63 g.) in acetonitrile at 80° C.

(c) Preparation of 4-chloro-10-hydroxy-10-(1-methyl-4-piperidyl)dibenzo[a,d]cycloheptadiene (M.P.=183° C., 1.02 g.) by hydrogenation of 4-(4-chloro-10-hydroxy-10-dizenzo[a,d]cycloheptadienyl)-1-methyl pyridinium bromide (1.5 g.) at ordinary pressures and temperatures in an equeous ethanol medium in the presence of an Adams platinum catalyst.

(d) The 4-chloro-10-oxo-dibenzo[a,d]cycloheptadiene (melting at 139–140° C.) used in this preparation may itself be prepared like the other products of the same type described previously, but starting with 2-benzoyl-3-chlorobenzoic acid and successively preparing the following intermediates:

2-benzyl-3-chlorobenzoic acid M.P. 149° C.
Methyl 2-benzyl-3-chlorobenzoate (B.P. $_{0.15}$=146–151° C.)
2-benzyl-3-chlorobenzyl alcohol (B.P. $_{0.1}$=157–159° C.)
2-benzyl-3-chlorobenzyl bromide
(2-benzyl-3-chlorophenyl)acetonitrile M.P. 56–59° C.
(2,benzyl-3-chlorophenyl)acetic acid M.P. 102° C., this last product being cyclised to 4-chloro-10-oxo-dibenzo-[a,d]cycloheptadiene by heating in the presence of polyphosphoric acid Example 27

36 N sulphuric acid (0.84 cc.) is added over the course of 5 minutes to a solution of 2-methylthio-11-(1-methyl-4-piperidyl)-dibenzo[a,d]cycloheptatriene (10 g.) in acetic acid (120 cc.), cooled to 15° C. Thereafter a solution of 115 volumes strength hydrogen peroxide (2.92 cc.) in acetic acid (15 cc.) is poured in over the course of 12 minutes whilst maintaining the temperature below 15° C. After 16 hours stirring at ambient temperature, 5% palladium on charcoal (0.6 g.) is added to destroy the excess hydrogen peroxide, and stirring is continued for 2 hours. After separating off the palladium and the charcoal, the solution is reduced to a small volume by heating at 60° C. in a low vacuum. The residue is taken up in distilled water (500 cc.), and the solution obtained is washed with diethyl ether (300 cc.); the aqueous acid phase is separated off and then rendered alkaline to pH 10 by adding 10 N caustic soda, whilst maintaining the temperature below 20° C., in the presence of 300 cc. of ether. After washing the ether extracts until neutral by means of a total of 450 cc. of distilled water, drying over anhydrous potassium carbonate, filtering and evaporating the solvent, 10.5 g. of a crude product are obtained. The latter is taken up in boiling ethanol (50 cc.) and then treated with maleic acid (3.5 g.); after crystallising, and filtering and washing the crystals, 2-methanesulphinyl-11-(1-methyl-4-piperidyl)-dibenzo[a,c]cycloheptatriene maleate (8.7 g.) melting at 193–194° C. is obtained.

Example 28

36 N sulphuric acid (2.08 cc.) followed by a solution of 115 volumes strength hydrogen peroxide (7.3 cc.) in acetic acid (20 cc.) are added to a solution of 2-methylthio-11-(1-methyl-4-piperidyl) - dibenzo[a,d]cycloheptatriene (12.5 g.) in acetic acid (155 cc.), cooled to 15° C. After 16 hours stirring at ambient temperature followed by the same treatment as in the preceding example, 12.6 g. of a crude product are obtained and this is recrystallised from ethanol (45 cc.). One thus obtains 2-methanesulphonyl-11-(1-methyl - 4 - piperidyl)dibenzo[a,d]cycloheptatriene (9.3 g.) melting at 163–165° C.

The present invention includes within its scope pharmaceutical compositions containing, as active ingredient, at least one of the cycloheptatriene derivatives of Formula I, or pharmaceutically acceptable acid additions salts or quaternary ammonium salts thereof, either in the pure state or in association with a pharmaceutical carrier or coating. The invention includes especially such preparations made up for oral, parenteral or rectal administration, or topical application, e.g. as ointments or creams.

Solid compositions for oral administration include tablets, pills, powders and granules. In such solid compositions the active product is mixed with one or more inert diluents such as sucrose, lactose or starch. These compositions may also comprise, as is normal practice, additional substances other than inert diluents, e.g. lubricating agents such as magnesium stearate. Liquid compositions for oral administration include pharmaceutically acceptable emulsions, solutions, suspensions, syrups and elixirs containing inert diluents commonly used in the art, such as water or liquid paraffin. Besides inert diluents such compositions may also comprise adjuvents, such as wetting, emulsifying and suspending agents, and sweetening, flavouring or perfuming agents. The compositions according to the invention, for oral administration, also include capsules of absorbable material such as gelatin containing the active substance, with or without the addition of diluents or excipients.

Preparations according to the invention for parenteral administration include sterile aqueous or non-aqueous solutions, suspensions or emulsions. Examples of non-aqueous solvents or vehicles include propylene glycol, polyethylene glycol, vegetable oil such as olive oil, and injectable organic esters such as ethyl oleate. These compositions may also contain adjuvents, especially preserving, wetting, emulsifying and dispersing agents. Sterilisation may be carried out in various ways, for example by filtration through a bacteria-retaining filter, by incorporation in the composition of sterilising agents, by irradiation or by heating. They may also be prepared in the form of solid sterile compositions which may be dissolved in sterile water or some other sterile injectable medium immediately before use.

Compositions for rectal administration may be suppositories which contain, apart from the active product, excipients such as cocoa butter or a suitable wax base.

The percentage of active ingredient in the compositions of the invention may be varied, provided that it provides a sufficient proportion to give a suitable dosage. The dosage depends on the therapeutic effect desired, on the route of administration and on the duration of treatment; in the case of oral administration, the dosages may generally be between 5 mg. and 200 mg. of active product per day for an adult.

The following examples illustrate pharmaceutical compositions according to the invention.

Example A

Tablets of the following composition are prepared by the usual method:

|  | Mg. |
|---|---|
| 10 - [1-(4-methoxybenzyl)-4-piperidyl]dibenzo[a,d]-cycloheptatriene | 2.5 |
| Starch | 110 |
| Colloidal silica | 35 |
| Magnesium stearate | 2.5 |

Example B

Tablets having the following composition are prepared by the usual technique:

|  | Mg. |
|---|---|
| 2-chloro-11-[1-benzyl-4-piperidyl]dibenzo[a,d]cycloheptatriene | 2.5 |
| Starch | 110 |
| Colloidal silica | 35 |
| Magnesium stearate | 2.5 |

Example C

Tablets of the following composition are prepared by the usual technique:

|  | Mg. |
|---|---|
| 2-chloro-11-[1-(4-methoxybenzyl)-4-piperidyl]dibenzo[a,d]cycloheptatriene | 2.5 |
| Starch | 110 |
| Colloidal silica | 35 |
| Magnesium stearate | 2.5 |

I claim:
1. A member selected from the group consisting of the dibenzo[a,d]cycloheptatriene of the formula:

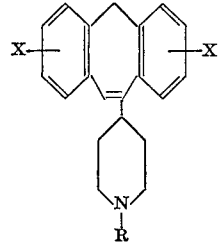

wherein one of the two X substituents is a hydrogen atom and the other is selected from the group consisting of hydrogen and halogen atoms and alkyl, alkoxy, alkylthio, alkanesulphinyl and alkanesulphonyl groups of up to 5 carbon atoms, and R is a radical selected from the group consisting of hydrogen and alkyl, alkenyl, alkynyl, hydroxyalkyl and hydroxyalkoxyalkyl in which each hydrocarbon chain is of up to 5 carbon atoms, and phenylalkyl of up to 11 carbon atoms in which the phenyl nucleus may be substituted by alkoxy of up to 5 carbon atoms; and the pharmaceutically acceptable acid addition salts and the quaternary ammonium salts thereof.

2. A member selected from the group consisting of the dibenzo[a,d]cycloheptatriene according to claim 1 of the formula:

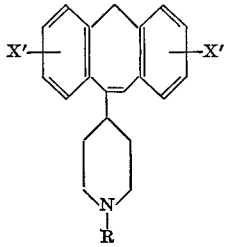

wherein one of the two X' substituents is a hydrogen atom and the other is selected from the group consisting of hydrogen and halogen atoms and alkyl, alkoxy, alkylthio and alkanesulphonyl groups of up to 5 carbon atoms, and R is a radical selected from the group consisting of hydrogen and alkyl, alkenyl, alkynyl, hydroxyalkyl and hydroxyalkoxyalkyl in which each hydrocarbon chain is of up to 5 carbon atoms, and phenylalkyl of up to 11 carbon atoms in which the phenyl nucleus may be substituted by alkoxy of up to 5 carbon atoms; and the pharmaceutically acceptable acid addition salts and the quaternary ammonium salts thereof.

3. A member selected from the group consisting of the dibenzo[a,d]cycloheptatriene according to claim 1 of the formula:

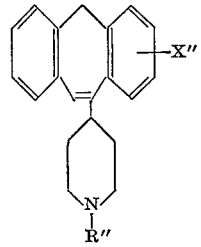

wherein X" represents a radical selected from the group consisting of hydrogen, chlorine and methylthio, and R" is a radical selected from alkyl of up to 5 carbon atoms and phenylalkyl of up to 11 carbon atoms in which the phenyl nucleus may be substituted by alkoxy of up to 5 carbon atoms, and the pharmaceutically acceptable acid addition salts and quaternary ammonium salts thereof.

4. A dibenzo[a,d]cycloheptatriene according to claim 3, wherein R" is a radical selected from the class consisting of methyl, benzyl and 4-methoxybenzyl radicals.

5. A dibenzo[a,d]cycloheptatriene according to claim 3, which is 2-methylthio-11-(1-methyl - 4 - piperidyl)dibenzo[a,d]cycloheptatriene and its pharmaceutically acceptable acid addition salts.

6. A dibenzo[a,d]cycloheptatriene according to claim 3, which is 2-chloro-11-(1-methyl-4-piperidyl)dibenzo[a,d]cycloheptatriene and its pharmaceutically acceptable acid addition salts.

7. A dibenzo[a,d]cycloheptatriene according to claim 2 which is 10-(1-propargyl-4-piperidyl)dibenzo[a,d]cycloheptatriene and its acid pharmaceutically acceptable addition salts.

8. A dibenzo[a,d]cycloheptatriene according to claim 1 which is 2-methanesulphinyl-11-(1-methyl-4-piperidyl)dibenzo[a,d]cycloheptatriene and its pharmaceutically acceptable acid addition salts.

9. A dibenzo[a,d]cycloheptatriene according to claim 1 which is 3-chloro-10-(1-methyl-4-piperidyl)dibenzo[a,d]cycloheptatriene and its pharmaceutically acceptable acid addition salts.

References Cited

Engelhardt et al.: "Structure-Activity Relationships in the Cyproheptadine Series" J. Med. Chem. 8(6) pp. 829–35, 1965 (Eng.).

HENRY R. JILES, Primary Examiner

G. T. TODD, Assistant Examiner

U.S. Cl. X.R.

260—293, 294, 294.7, 590, 999